Sept. 22, 1925.  
H. BUSCH  
BENCH VISE  
Filed Sept. 15, 1924

Inventor:  
H. Busch  
By Marks & Clerk  
attys

Patented Sept. 22, 1925.

1,554,710

UNITED STATES PATENT OFFICE.

HANS BUSCH, OF NEUSTADT-ORLA, GERMANY.

BENCH VISE.

Application filed September 15, 1924. Serial No. 737,936.

*To all whom it may concern:*

Be it known that I, HANS BUSCH, a citizen of Germany, and residing at No. 26 Bismarckstr., Neustadt-Orla, Germany, have invented certain new and useful Improvements in Bench Vises, of which the following is a specification.

This invention relates to bench vises in which two sleeves, supporting the jaws and capable of sliding relatively to one another, are journaled rotatably about a horizontal axis in a casing which is mounted on the base plate so as to be rotatable about a vertical axis. According to the invention, for fixing the sleeves in the casing, two wedges are provided in said casing which are guided so as to slide at right angles to one another, one wedge being adjustable from outside by means of a separate screw, while the other wedge engages in a tapered circumferential groove of the outer sleeve.

The invention has the advantage that great security is attained against undesired rotation of the sleeve and jaws; furthermore it is not necessary to arrange a slot in the casing or to make it of two parts.

Figure 1:
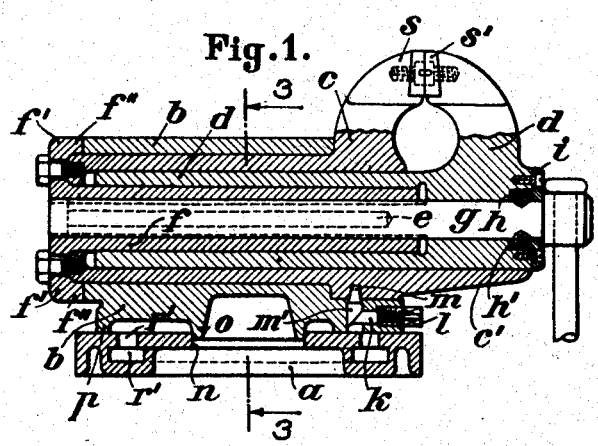
Figures 2, 3:
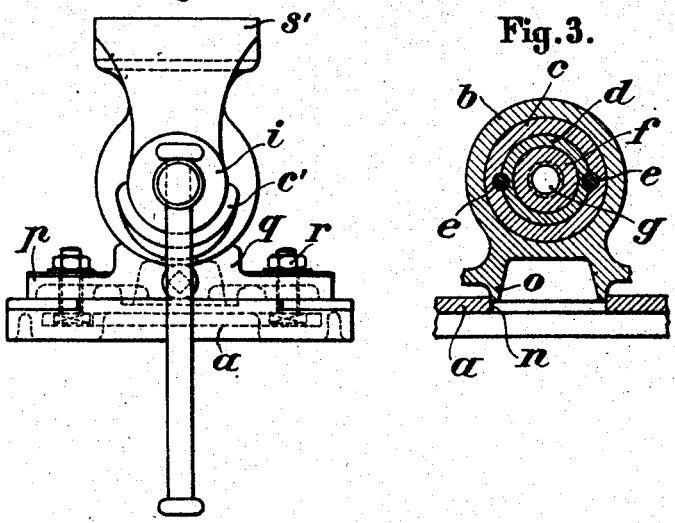

In the accompanying drawing a constructional example of the invention is shown,

Fig. 1 being a vertical longitudinal section through the vise,

Fig. 2 a front view,

Fig. 3 a vertical section on line 3—3 of Fig. 1, and

Figure 4:
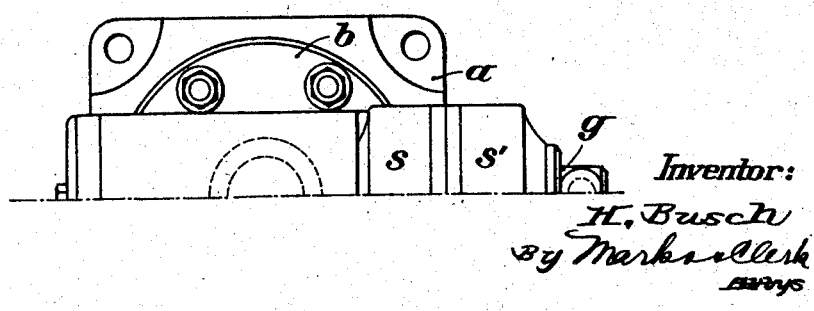

Fig. 4 a half plan view.

On the base plate $a$, which is to be fixed to the bench, the casing $b$ of the vise is mounted so as to be rotatable about a vertical axis. For this purpose the base plate $a$ is provided with a central circular hole $n$, in which a hollow spigot $o$ of the casing $b$ fits. The casing $b$ rests with an annular foot $p$ on the plate $a$. The foot $p$ is formed on a plate $q$, in which bolts $r$ are provided, the T-shaped heads of which engage in a slot $r'$ in the base plate $a$. The bolts $r$ serve the purpose of fixing the casing $b$ on the base plate $a$. The casing $b$ is provided with a cylindrical bore, in which the sleeve $c$ is journaled, which supports one of the jaws $s$. To the sleeve $c$ the spindle nut $f$ is fixed by means of a flange $f'$. The flange $f'$ is provided with an annular extension $f''$, which embraces the sleeve $c$ from the outside, so that the end of the sleeve $c$ is centred internally and externally between the outer surface of the spindle nut $f$ and the inner surface of the extension $f''$. The front end surface of the extension $f''$ rests firmly against the rear end surface of the casing $b$, as is clearly shown in Fig. 1.

Between the spindle nut $f$ and the sleeve $c$ is a second sleeve $d$, which supports the second jaw $s'$. The parts $c$ and $d$ are capable of sliding, but not rotating, relatively to one another. They are prevented from rotating by the two bolts $e$, which are parallel to the axis of the spindle.

The screw spindle $g$ is provided with a collar $h$, which is let into a groove $h'$ of the sleeve $d$ and is held in position from the outside by a cap $i$. By this means the screw spindle is secured from longitudinal displacement.

The two sleeves $c$ and $d$ are adapted to turn jointly in the casing $b$. On the under side of the sleeve $c$ is a tapered circumferential groove $m$. In this groove engages a wedge $m'$ of the same shape as the groove, which is adapted to move in a vertical guide in the casing. The lower face of the wedge $m'$ is also inclined and against this inclined surface rests a horizontal wedge $k$, which is adjustable by means of a screw $l$. By tightening the screw $l$, the wedge $k$ can be forced into the groove $m$, for the purpose of securing the sleeve $c$ against rotation.

The sleeve $c$ has a bracket-like lower extension $c'$ for supporting the sleeve $d$, more particularly when the vise is screwed out to a considerable extent.

In using the vise the bolt nuts $r$ are released when the vise is to be turned about the vertical axis, and the nuts are tightened again, after the turning motion is completed. For turning the vise about the horizontal axis, it is sufficient to release the screw $l$ by means of a box key and to tighten it again after the turning movement is completed.

What I claim is:—

A bench vise having in combination a base plate, a casing mounted on the said base plate and rotatable about a vertical axis, a screw spindle within the casing, two sleeves capable of sliding one within the other and journaled in the said casing so as to be capable of being turned about the axis of the screw spindle, two jaws each mounted on one of the said sleeves, means for fixing the sleeves in the casing comprising a tapered circumferential groove in the outer sleeve, two axially movable but non-rotatable members in the casing at right angles to one another, inclined surfaces on the said members capable of bearing against each other, one member being adjustable from the exterior of the casing by a separate screw and the other engaging in the tapered circumferential groove in the outer sleeve, and means for fixing the casing on the base plate, as set forth.

In testimony whereof I have signed my name to this specification.

HANS BUSCH.